(12) United States Patent
Bergstrom

(10) Patent No.: US 10,668,986 B2
(45) Date of Patent: Jun. 2, 2020

(54) SNOWMOBILE SKI BUMPER AND METHODS FOR USING SAME

(71) Applicant: Scott Bergstrom, Roscoe, IL (US)

(72) Inventor: Scott Bergstrom, Roscoe, IL (US)

(73) Assignee: 2726971 Ontario Inc., Ontario (CA)

( * ) Notice: Subject to any disclaimer, the term of this patent is extended or adjusted under 35 U.S.C. 154(b) by 125 days.

(21) Appl. No.: 15/793,816

(22) Filed: Oct. 25, 2017

(65) Prior Publication Data

US 2019/0118905 A1 Apr. 25, 2019

(51) Int. Cl.
*B62M 27/02* (2006.01)
*B62M 29/00* (2006.01)

(52) U.S. Cl.
CPC ............ *B62M 27/02* (2013.01); *B62M 29/00* (2013.01); *B62M 2027/025* (2013.01)

(58) Field of Classification Search
CPC ........................ B62M 27/20; B62M 2027/025
USPC ........................................................ 180/182
See application file for complete search history.

(56) References Cited

U.S. PATENT DOCUMENTS

| | | | | |
|---|---|---|---|---|
| 380,819 A * | 4/1888 | Reynolds | ......................... | 280/26 |
| 3,525,412 A * | 8/1970 | Erickson | ............... | B62M 27/02 280/25 |
| 3,613,809 A * | 10/1971 | Chaumont | ............. | B62M 27/02 180/182 |
| 3,693,992 A * | 9/1972 | Piedboeuf | ............. | B62M 27/02 180/182 |
| 3,773,343 A * | 11/1973 | Ambrose | ............... | B62M 27/02 264/261 |
| 4,319,656 A * | 3/1982 | Kobayashi | ............. | B62B 13/10 180/182 |
| 4,328,878 A * | 5/1982 | Yoshida | ................. | B62B 13/10 180/182 |
| 4,364,447 A * | 12/1982 | Yoshida | ................. | B62B 13/10 180/182 |
| 4,372,567 A * | 2/1983 | Yasui | ...................... | B62B 17/04 180/182 |
| 4,433,856 A * | 2/1984 | Yoshida | ................. | B62B 13/10 180/190 |
| 4,489,954 A * | 12/1984 | Yasui | ...................... | B62B 17/04 180/190 |
| 4,591,173 A * | 5/1986 | Marier | .................... | B62B 13/10 180/190 |
| 4,690,234 A * | 9/1987 | Takada | .................... | B62B 17/04 180/182 |

(Continued)

OTHER PUBLICATIONS

T.J. Krob; Snowmobile Steering Systems, How Handlebars, Arms, Links & Skis Work Together; magazine; 2 pages; Feb. 2017; Snowmobile Science, Snowgoer.com.

*Primary Examiner* — Jacob D Knutson
(74) *Attorney, Agent, or Firm* — Reinhart Boerner Van Deuren P.C.

(57) ABSTRACT

A replacement bumper for a snowmobile ski is provided and methods for using the same. The replacement bumper has an abutment surface that makes contact with a spindle of a snowmobile in order to increase the contact surface area of a rear portion of a snowmobile ski and the ground and/or increase the weight being distributed on the rear portion of the snowmobile ski, which prevents the darting or tracking of the snowmobile ski. Also, includes is a method for removing an OEM bumper from a snowmobile ski assembly and installing a replacement bumper into said snowmobile ski assembly.

16 Claims, 8 Drawing Sheets

(56) References Cited

U.S. PATENT DOCUMENTS

| | | | | |
|---|---|---|---|---|
| 5,474,146 A | * | 12/1995 | Yoshioka | B62K 13/00 180/184 |
| 6,955,237 B1 | | 10/2005 | Przekwas et al. | |
| 8,690,182 B2 | * | 4/2014 | Wrightman | B62B 17/02 180/182 |
| 2002/0105166 A1 | * | 8/2002 | Lemieux | B62B 17/02 280/609 |
| 2018/0141580 A1 | * | 5/2018 | Mallette | B62B 17/02 |

* cited by examiner

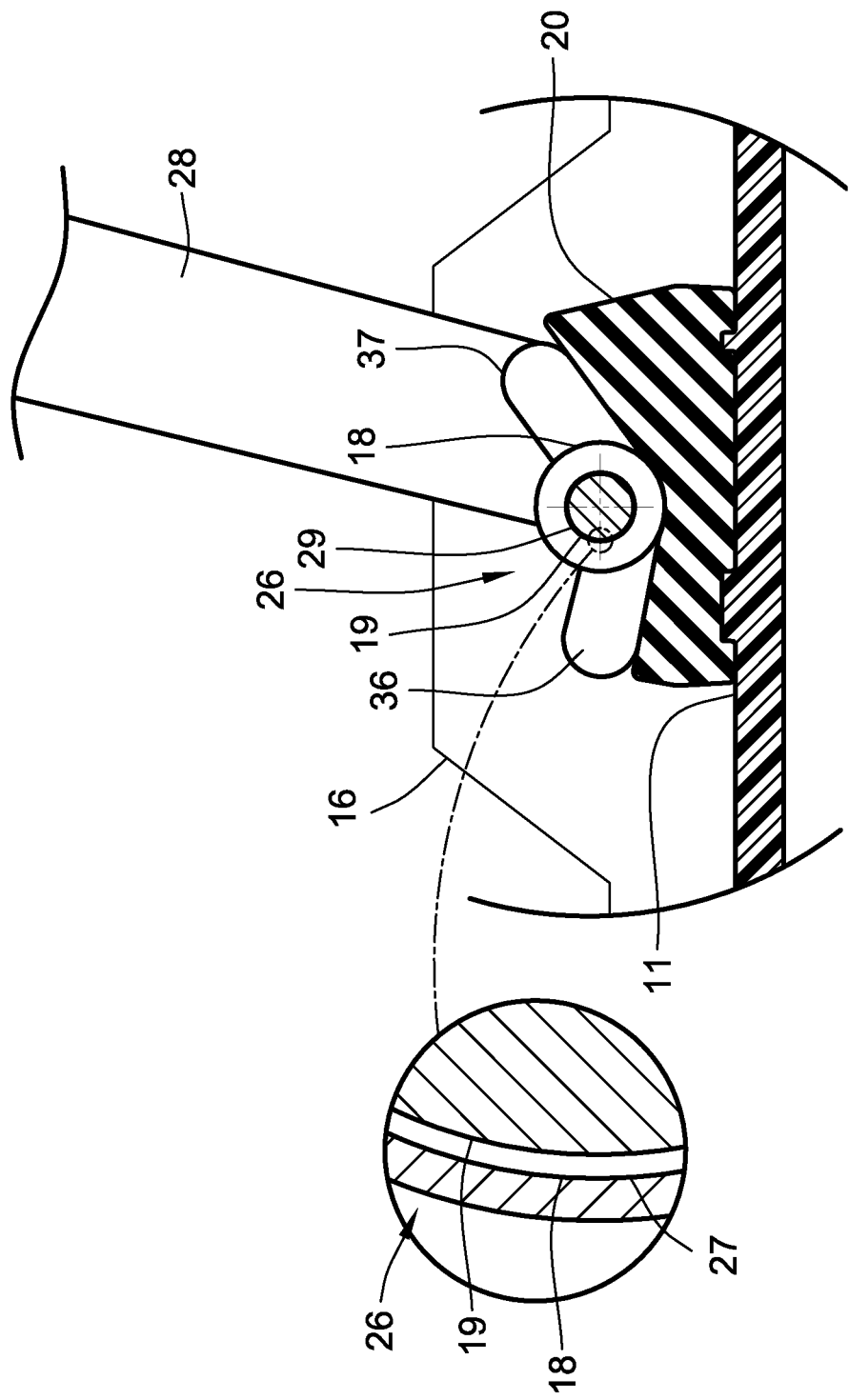

SNOWMOBILE SKI BUMPER AND METHODS FOR USING SAME

FIELD OF THE INVENTION

This invention generally relates to improving the steerability of a snowmobile and reducing the problem of snowmobile ski darting and tracking, and in particular to the replacement of the snowmobile ski bumpers placed between the spindle and skis of a snowmobile.

BACKGROUND OF THE INVENTION

Darting occurs in snowmobiles when the front end of a snowmobiles ski or carbide digs into a rut in the snow and causes the snowmobile ski to move in the direction of the rut. Often times, the direction of the rut will be in a different path than intended by the user of the snowmobile, which is what causes the snowmobile to "dart" off path.

Darting in an unintended path can be very dangerous as it can cause accidents with stationary objects such as a tree, or other snowmobiles in the vicinity, or simply cause the rider to fly off the snowmobile.

Further, some modern snowmobiles are capable of reaching speeds in excess of 90 mph in certain conditions. At such high speeds, if the snowmobile were to dart off path, it may be impossible for the driver to right the direction of the snowmobile before hitting an object, person, or snowmobile, which, at such high speeds, can cause catastrophic injuries to the snowmobiler or any bystanders in the vicinity.

Darting is a well-known problem in the snowmobile industry and a plethora of skis, carbides, studs, etc. have been brought to market that claim to prevent darting. However, replacing or upgrading the skis, carbides, studs, etc. of a snowmobile can be expensive and time consuming. Further, many of the parts brought to market only partially or temporarily fix the snowmobiles darting problems.

One component that has not been designed or manufactured in order to prevent darting is the bumpers that are placed between the skis and the spindles of the snowmobile.

The bumpers produced today all follow the specifications of the bumpers that were produced by the Original Equipment Manufacturer ("OEM") and included as components of the snowmobile during the manufacturer of the snowmobile by the OEM's.

A list of some of the OEM's that have designed bumpers for the snowmobiles that they produce includes, but is not limited to, Arctic Cat, Ski-Doo, Polaris, Yamaha, etc.

In addition to the bumpers produced by the OEM's, there exists a secondary market for bumpers. Some of the manufacturers in the secondary bumper market includes Kimpex, Qualipieces, Roetin, Snow-Stuff, Snowtracker, USI, Stud Boy, and Woody's.

However, the bumpers being produced by the secondary market manufacturers are being made according to the same exact specifications of the OEM bumpers that they are intended to replace.

Thus, the snowmobile industry has not considered the important role the design of the bumper can play in preventing the darting of a snowmobile due to the bumper's interaction between both the ski and the spindle of the snowmobile.

As such, there is a need for a replacement bumper designed to interact with the ski and spindle of a snowmobile in order to prevent the darting of the snowmobile.

The invention provides a replacement bumper that is relatively cheap to produce, improves the steerability of the snowmobile by reducing darting or tracking, as well as a method for easily and efficiently replacing OEM bumpers with said replacement bumpers. These and other advantages of the invention, as well as additional inventive features, will be apparent from the description of the invention provided herein.

BRIEF SUMMARY OF THE INVENTION

In one aspect, a method of adjusting the orientation of a snowmobile ski is provided. The snowmobile ski having a front end and a rear end, and mounted to a spindle at a pivot axis between the rear end and front end of the ski. The method including removing a OEM bumper positioned between a free end of the spindle and a ski body of the snowmobile ski. The OEM bumper having a first abutment portion positioned between the rear end of the ski and the pivot axis prior to removing the OEM bumper that contacts the spindle. The front end and rear end of the ski having a first orientation when the first abutment portion contacts the spindle.

The method also including installing a replacement bumper positioned between the free end of the spindle and the ski body of the ski. The replacement bumper having a second abutment portion positioned between the rear end of the ski and the pivot axis when installed that contacts the spindle. The front end and rear end of the ski having a second orientation when the second abutment portion contacts the spindle.

The method where the ski has less weight distributed on the front end of the ski in the second orientation than the first orientation and the ski having more weight distributed on the rear end of the ski in the second orientation than the first orientation.

In yet another aspect, the method where the ski body has a bumper mounting surface on which a first mounting surface of the OEM bumper rests when installed. The first abutment portion defining a first contact surface that contacts the spindle at a location between the rear end of the ski and the pivot axis. The first contact surface being spaced a first distance from the first mounting surface.

The replacement bumper having a second mounting surface which rests on the bumper mounting surface when installed, the second abutment portion defining a second contact surface that contacts the spindle at a location between the rear end of the ski and the pivot axis when installed. The second contact surface being spaced a second distance from the second mounting surface and the second distance being greater than the first distance.

In yet another aspect, the replacement bumper is made from polyurethane.

In yet another aspect, the instillation of the replacement bumper will change the weight distribution from the front end of the ski to the rear end of the ski by 1 to 100%.

In yet another aspect, the replacement bumper has a maximum height relative to a top of the ski when it is installed in the ski that is greater than a maximum height of the OEM bumper relative to the top of the ski when it is installed in the ski.

In yet another aspect, the maximum height of the replacement bumper is between 0.1 inches and 0.5 inches greater than the maximum height of the OEM bumper.

In yet another aspect, the pivot axis is provided by a spindle bolt passing through an opening in the spindle and a first and second opening in the ski.

In yet another aspect, the spindle bolt has a lock that mechanically couples the spindle and the ski.

In yet another aspect, the ski can still rotate about the pivot axis after being mechanically coupled to the spindle.

In another aspect according to the present application, a method of adjusting the orientation of a snowmobile ski is provided. The snowmobile ski having a front end and a rear end and mounted to a spindle at a pivot axis between the rear end and front end of the ski. The method including removing a first bumper positioned between the spindle and a top surface of a ski. The first bumper having a first abutment surface that prior to removing the first bumper contacts the spindle. The ski having a first orientation relative to a planar ground surface when the first abutment surface contacts the spindle.

The method further including installing a second bumper positioned between the spindle and a top surface of the ski. The second bumper having a second abutment surface that when installed contacts the spindle and the ski having a second orientation relative the ground surface when the second abutment surface contacts the spindle.

In yet another aspect, the second orientation at the front end of the ski is further from the ground than in the first orientation.

In yet another aspect, the second orientation a rear end of the ski is closer to the ground than in the first orientation.

In yet another aspect, the pivot axis is provided by an axis of rotation of a spindle bolt.

In yet another aspect, the method includes inserting a spindle bolt into an opening of the ski and an opening of the spindle after the installation of the second bumper to mechanically couple the ski to the spindle.

In another aspect according to the present application a method of adjusting the orientation of a snowmobile ski is provided. The snowmobile ski having a front end and a rear end and being mounted to a spindle at a pivot axis between the rear end and front end of the ski.

The method including removing a OEM bumper positioned between a free end of the spindle and a ski body of the snowmobile ski. The OEM bumper having a first abutment portion positioned between the rear end of the ski and the pivot axis prior to removing the OEM bumper that contacts the spindle. The ski having a first orientation wherein the front end of the ski has a first angle relative to the planar ground and the rear end of the ski has a first angle relative to the planar ground.

The method further including installing a replacement bumper positioned between the free end of the spindle and the ski body of the ski. The replacement bumper having a second abutment portion positioned between the rear end of the ski and the pivot axis when installed that contacts the spindle. The ski having a second orientation wherein the front end of the ski has a second angle relative to the planar ground and the rear end of the ski has a second angle relative to the planar ground.

The second orientation the angle between the front end of the ski and the planar ground is greater than in the first orientation and the first orientation angle between the rear end of the ski and the planar ground is greater than in the second orientation.

In yet another aspect, the ski body has a bumper mounting surface on which a first mounting surface of the OEM bumper rests when installed. The first abutment portion defining a first contact surface that contacts the spindle at a location between the rear end of the ski and the pivot axis. The first contact surface being oriented at a first angle relative to the mounting surface.

The replacement bumper having a second mounting surface which rests on the bumper mounting surface when installed. The second abutment portion defining a second contact surface that contacts the spindle at a location between the rear end of the ski and the pivot axis when installed. The second contact surface being oriented at a second angle relative to the mounting surface and where the second angle is less than the first angle.

In yet another aspect, the instillation of the replacement bumper changes an orientation between the front end of the ski and the rear end of the ski by between 1 and 45 degrees.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 2B is a close up cross-sectional view of the snowmobile ski assembly of FIG. 2A showing the interaction between the spindle bolt, spindle, and replacement bumper of the snowmobile ski assembly;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1A:
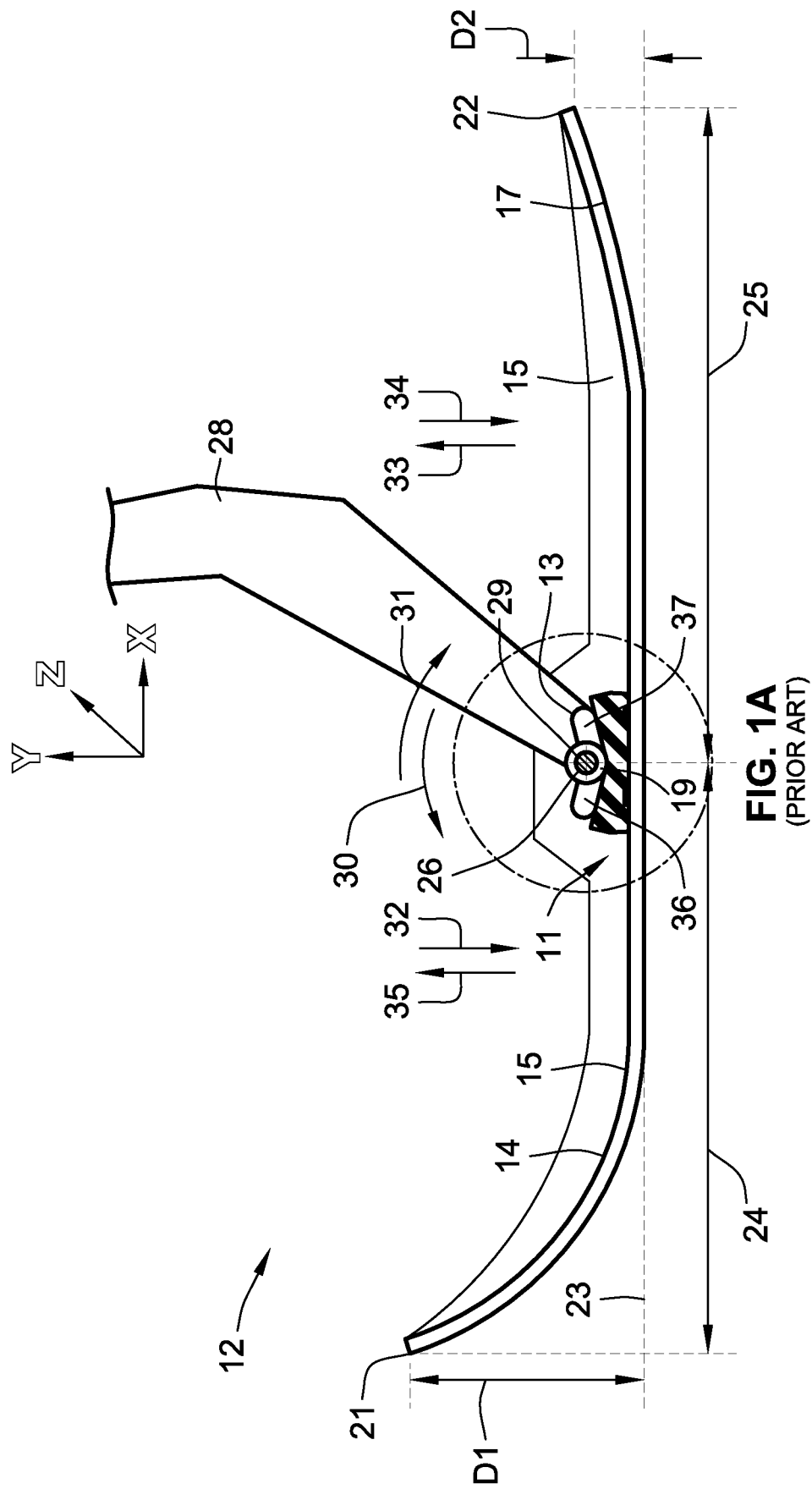
FIG. 1A is a cross-sectional view of a snowmobile ski assembly having an OEM snowmobile ski bumper.
Figure 1B:
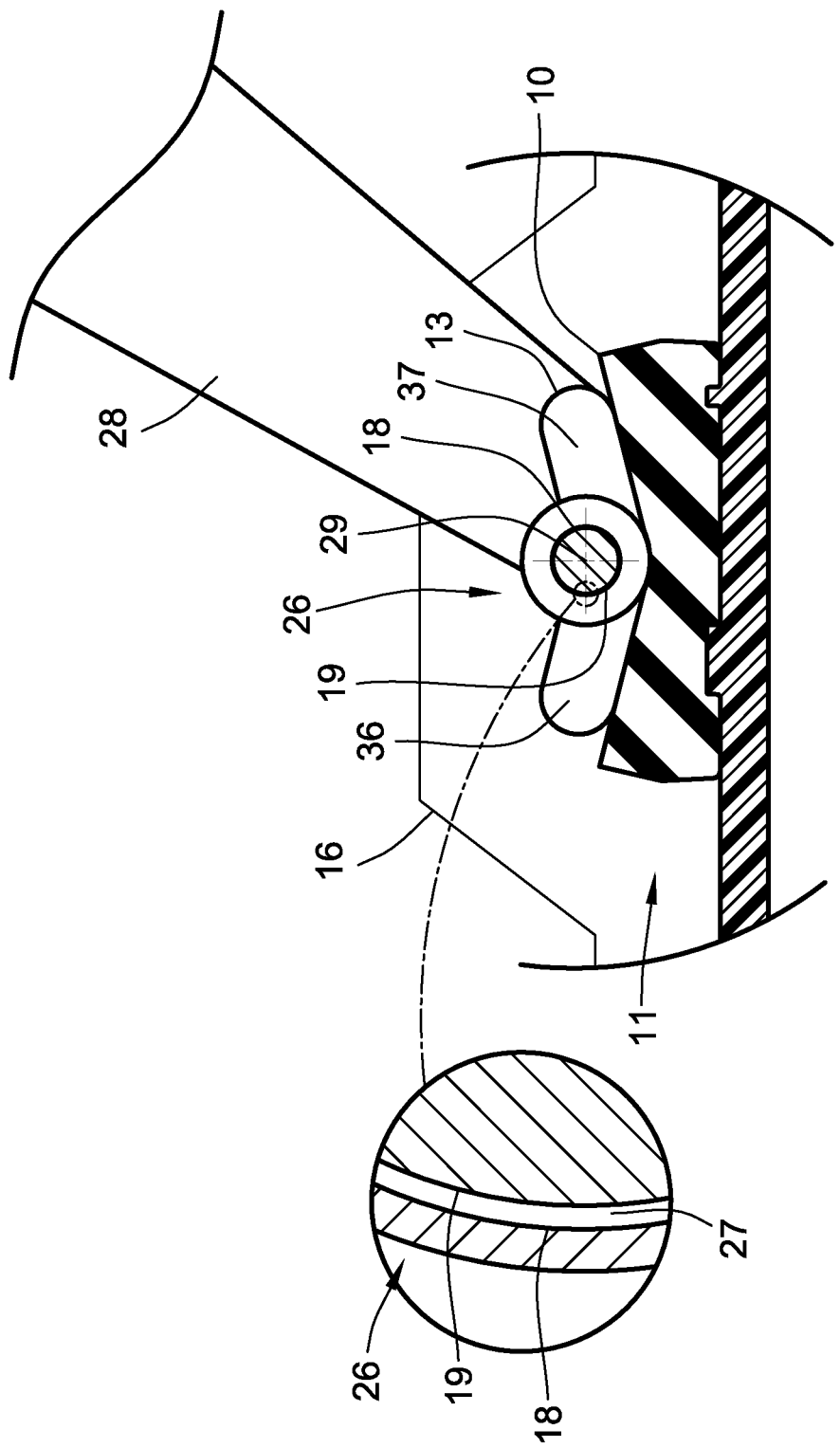
FIG. 1B is a close up cross-sectional view of the snowmobile ski assembly of FIG. 1A showing the interaction between the spindle bolt, spindle, and OEM bumper of the snowmobile ski assembly.

FIG. 1A is a cross-section of a snowmobile ski assembly 12 (hereinafter "ski assembly 12") and FIG. 1B is a close up view of the ski assembly illustrated in FIG. 1A.

As FIGS. 1A-1B are cross-sectional views, only one side of the ski assembly 12 is illustrated. However, it will be understood that the opposite side of the ski assembly 12 will have features that are identical to those illustrated in FIGS. 1A-1B.

The ski assembly 12 includes a ski 14, a spindle 13, and an OEM bumper 10.

The ski 14 has a top surface 15 and a bottom surface 17. Projecting from the top surface 15 is a sidewall 16 that includes an opening 18 that allows for the passage of a spindle bolt 19. While only one sidewall 16 is shown, typically a second sidewall 16 will be provided forming a gap therebetween that receives the end of the spindle 13.

The top surface 15 and the sidewalls 16 define a bumper pocket 11 of the ski 14. As illustrated, the OEM bumper 10 is placed within the bumper pocket 11, such that the OEM bumper 10 rests against and abuts the top surface 15 of the ski 14 within the bumper pocket 11. Alternatively, an intervening saddle may be located between the sidewalls 16 and the spindle 13.

The spindle 13 has a coupling portion 26 and a neck portion 28 that extends from the coupling portion 26. The coupling portion 26 includes an opening 27 that extends through the coupling portion 26 and receives the spindle bolt 19.

The spindle 13 also includes a first leg portion 36 and a second leg portion 37. As illustrated, the coupling portion 26 of the spindle 13 abuts against a spindle receptacle 113 of the OEM bumper 10 (see FIG. 7), the first leg portion 36 abuts against a front surface 108' of the OEM bumper 10 (see FIG. 7), and the second leg portion 37 abuts against a rear surface 110' of the OEM bumper 10 (see FIG. 3).

The shape of the spindle 13 and particularly the first leg portion 36 and the second leg portion 37 is such that after the spindle bolt 19 has been inserted into the ski 14 and the spindle 13, the ski 14 is still capable of partially rotating about the axis of rotation 29 of the spindle bolt 19 in a first direction 30 where the front tip 21 of the ski 14 is moved closer to the ground 23 and a second direction 31 where the rear tip 22 of the ski 14 is lowered closer to the ground 23.

As will be understood, the front tip 21 and the rear tip 22 of the ski 14 have an inverse rotational relationship about the axis of rotation 29 of the spindle bolt 19.

For example, as the front tip 21 of the ski 14 is moved in a direction 32 closer to the ground 23 the rear tip 22 of the ski 14 will move in a direction 33 further away from the ground 23.

Likewise, as the rear tip 22 of the ski 14 is moved in a direction 34 closer to the ground 23 the front tip 21 of the ski 14 will move in a direction 35 further away from the ground 23.

As illustrated, when the ski assembly 12 is resting in its natural position with the OEM bumper 10 installed, the front tip 21 of the ski 14 is a distance D1 from the ground 23 and the rear tip 22 of the ski 14 is a distance D2 from the ground 23.

As previously discussed, when the ski 14 is mechanically coupled to the spindle 13 via the spindle bolt 19, the front tip 21 of the ski 14 and a back tip 22 of the ski 14 have an inverse rotational relationship. Therefore, as the distance D1 increases, the distance D2 decreases and vice versa.

As will be understood, as the distance D1 increases, less of the front portion 24 of the ski 14 is in contact with the ground 23 while more of the rear portion 25 of the ski 14 makes contact with the ground 23.

Likewise, as the distance D2 increases, less of the rear portion 25 of the ski 14 is in contact with the ground 23 and more of the front portion 24 of the ski 14 makes contact with the ground 23.

Therefore, to prevent darting, it has been determined that it is important to prevent the front portion 24 of the ski 14 digging into a rut while having the rear portion 25 of the ski 14 in contact with the ground 23 in order to correct any darting originating from the front portion 24 of the ski 14. This allows the ski to travel over the rut rather than digging into the rut.

More particularly, the best way to prevent darting in a ski 14 is to decrease the contact surface area between the front portion 24 of the ski 14 and the ground 23, which is where darting occurs due to the front portion 24 of the ski 14 hitting a rut in the snow, and to increase the contact surface area between the rear portion 25 of the ski 14 and the ground 23, which is the portion of the ski 14 that acts to correct the darting at the front portion 24 of the ski 14.

As will be discussed below, the replacement bumpers 20, 112, 128, and 144 described herein prevent darting in the same ski assembly 12 of their OEM bumper 10 counterparts by making contact with the spindle 13 such that the front portion 24 of the ski 14 makes less contact with the ground 23 and the rear portion 25 of the ski 14 makes more contact with the ground 23 than if the same ski assembly 12 was utilizing a corresponding OEM bumper 10.

Figure 2A:
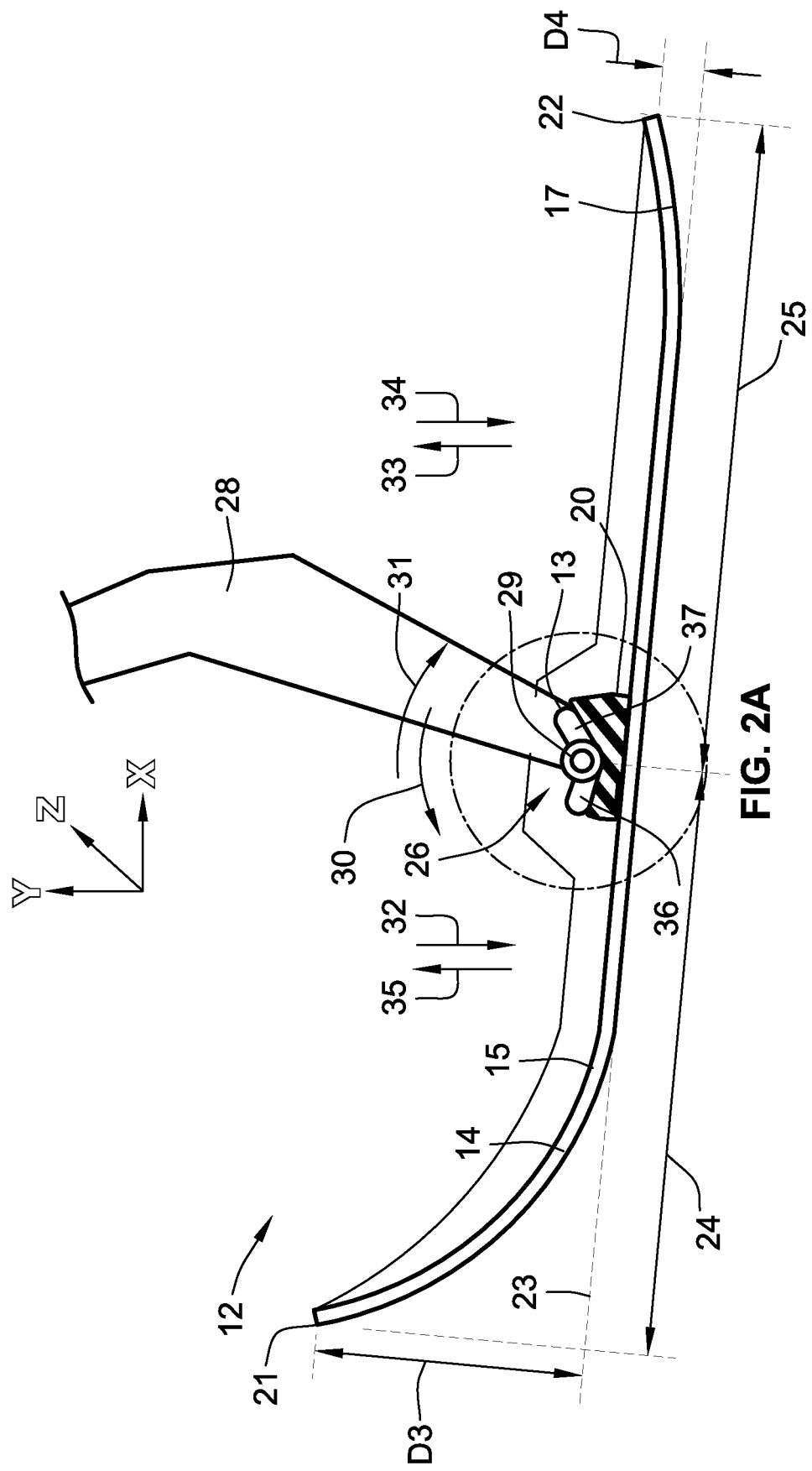
FIG. 2A is a cross-section view of a snowmobile ski assembly having a replacement snowmobile ski bumper according to one embodiment of the present application.

Turning to FIGS. 2A-2B, the ski assembly 12 in FIGS. 1A-1B is illustrated with the exception that the OEM bumper 10 has been removed and replaced with a replacement or second bumper 20 according to one aspect of the present application.

Figure 3:
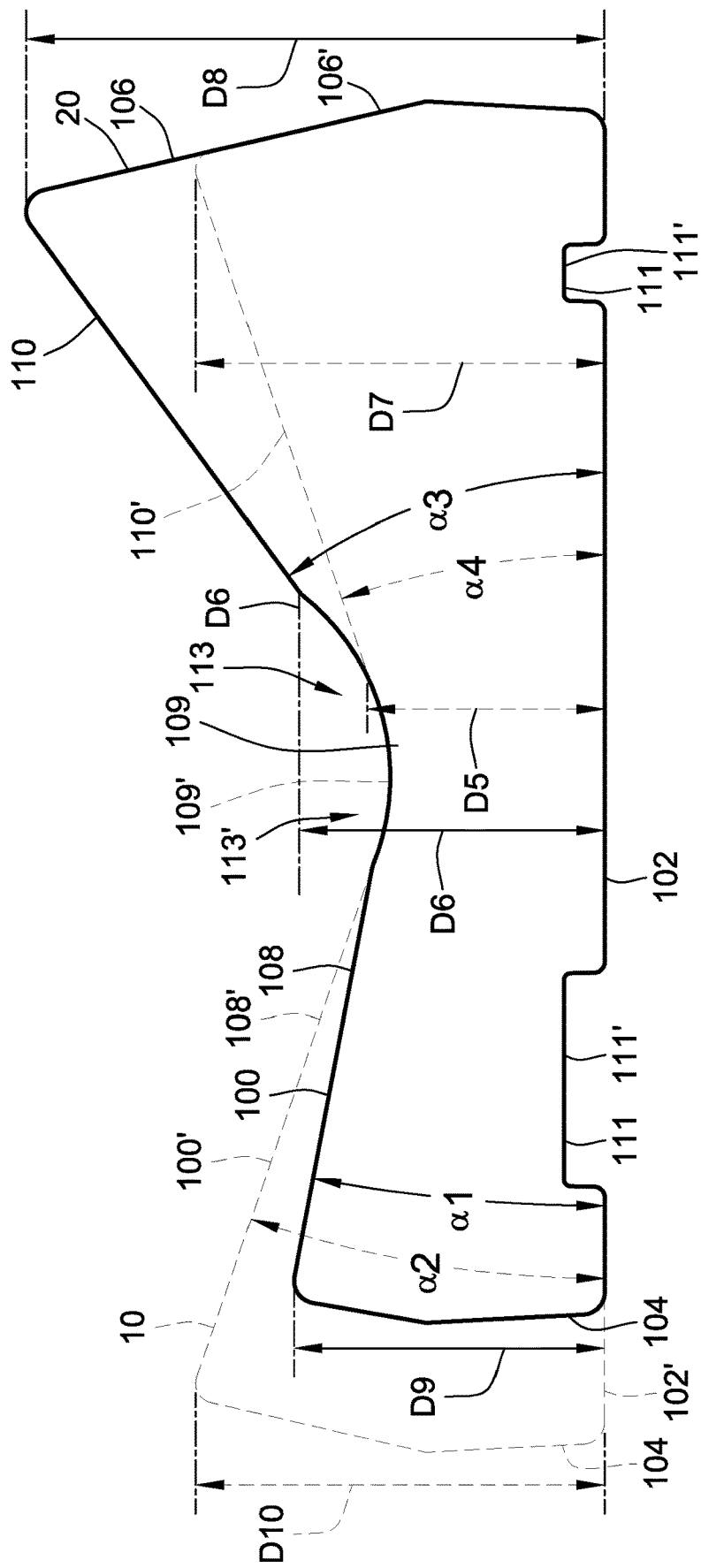
FIG. 3 is a side view of a OEM snowmobile ski bumper and a replacement snowmobile ski bumper according to one embodiment of the present application.

As illustrated, in schematic form with exaggeration for illustration purposes replacing the OEM bumper 10 with the replacement bumper 20 causes the position of the ski 14 to be rotated in the second direction 31 about the axis of rotation 29 due to the interaction of the first leg portion 36 and a second leg portion 37 of the spindle 13 with the front surface 108 and the rear surface 110 of the replacement bumper 20 (see FIG. 3). This changes the orientation or down pressure of the ski 14 relative to the ground 23.

While illustrated as having a different orientation to the ground 23, the ski 14 may actually have the same orientation relative to the ground 23 if the bumper 20 is compressed. However, the bumper 20 will adjust the down pressure applied by the front portion 24 and rear portion 25 of the ski 14 to shift the increased down pressure and toward the rear portion 25 of the ski 14.

As can be seen, the rotation of the ski 14 in the second direction 31 about the axis of rotation 29 is due to the front portion 36 and rear portion 37 of the spindle 13 abutting against the different front surface 108 and the rear surface 110 of the replacement bumper 20, which are differently oriented/sized/shaped than in the OEM bumper 10.

With the replacement bumper 20 installed, the front tip 21 of the ski 14 is now a distance D3 from the ground 23 and the rear tip 22 of the ski 14 is now a distance D4 from the ground 23 due to front portion 36 and the rear portion 37 of the spindle 13 abutting against the more angled front surface 108 and rear surface 110 of the replacement bumper 20. In this instance D3 is greater than D1 and D4 is less than D2 (see FIG. 3).

Again, as discussed above, when the distance D3 increases the distance D4 decreases and vice versa.

Therefore, when the replacement bumper 20 is installed in the ski assembly 12, the distance D3 increases, causing less of the front portion 24 of the ski 14 to be in contact with the ground 23 and the distance D4 decreases, causing more of the rear portion 25 of the ski 14 to be in contact with the ground 23.

As discussed above, to prevent darting, due to the shape and configuration at surface 108, 110 of replacement bumper 20 relative to surface 108'. 110' of the OEM bumper 10, it is desirable to increase the contact surface area between the rear portion 25 of the ski 14 and the ground 23 while also decreasing the contact surface area between the front portion 24 of the ski and the ground 23.

Turning to FIGS. 1A-1B and 2A-2B, the distance D1 illustrated in FIG. 1 with the OEM bumper 10 installed is less than the distance D3 of FIG. 2A with the replacement bumper 20 installed.

Likewise, the distance D2 illustrated in FIG. 1A is greater than the distance D4 illustrated in FIG. 2A with the replacement bumper 20 installed.

Therefore, replacing the OEM bumper 10 with the replacement bumper 20 causes more of the rear portion 25 of the ski 14 to contact the ground 23 and less of the front portion 24 of the ski 14 to contact the ground 23.

Thus, replacing the OEM bumper 10 with the replacement bumper 20 creates more surface contact area between the rear portion 25 of the ski 14 and the ground 23, which prevents darting in snowmobile skis, by creating less contact surface area between the front portion 25 of the ski 14 and the ground, which causes darting of snowmobile skis.

Thus, removing an OEM bumper 10 from a ski assembly 12, as illustrated in FIGS. 1A-1B, and installing a corresponding replacement bumper 20 in the same ski assembly 12, as illustrated in FIG. 2A-2B, results in a ski 14 with altered contact surface points with the ground 23 that are ideal for preventing the ski 14 from darting during use.

Turning to FIG. 3 illustrating a side view of the replacement bumper 20 laid over the OEM bumper 10.

As illustrated, the OEM bumper 10 has a top surface 100', a bottom surface 102, front wall 104', a rear wall 106'. Likewise, the replacement bumper 20 has a top surface 100, a bottom surface 102, a front wall 104 and a rear wall 106.

The top surface 100' of the OEM bumper 10 has a front surface 108', a spindle pocket surface 109', and a rear surface 110'. Likewise, the replacement bumper 20 also has a front surface 108, a spindle pocket surface 109', and rear surface 110'.

The front surface 108 of the replacement bumper 20 has a maximum height represented by D9 and the front surface 108' of the OEM bumper 10 has a maximum height represented by D10. As illustrated, the maximum height D9 of the front surface 108 of the replacement bumper 20 is less than the maximum height D10 of the front surface 108' of the OEM bumper 10. Further, front surface 108 has an angle α1 relative to bottom surface 102 that is less than angle α2 defined by the front surface 108' of bottom surface 102'.

The spindle pocket surface 109 of the replacement bumper 20 and the spindle pocket surface 109' of the OEM bumper 10 make up the respective spindle receptacles 113', 113 of the OEM bumper 10 and the replacement bumper 20.

The respective spindle receptacles 113', 113 of the OEM bumper 10 and the replacement bumper 20 are the portion of the OEM bumper 10 and the replacement bumper 20 where the coupling portion 26 of the spindle 13 make contact with and abut the OEM bumper 10 and the replacement bumper 20 (see FIGS. 1A-1B and 2A-2B).

As the same spindle 13 is used with both the OEM bumper 10 and the replacement bumper 20, the respective spindle receptacle 113', 113 have very similar shapes to both accommodate and allow rotation of the coupling portion 26 of the spindle 13 (see FIGS. 1A-1B and 2A-2B). However, the spindle receptacles 113', 113 have different orientations relative to the corresponding bottom surfaces 102', 102 with some slight variations.

Turning back to FIG. 3, the spindle pocket surface 109 of the replacement bumper 20 has a maximum height represented by D5 and the spindle pocket surface 109' of the OEM bumper 10 has a maximum height represented by D6. As illustrated, the maximum height D6 of the spindle pocket surface 109 of the replacement bumper 20 is greater than the maximum height D5 of the spindle pocket surface 109' of the OEM bumper 10.

Next, the rear surface 110 of the replacement bumper 20 has a maximum height represented by D8 and the rear surface 110' of the OEM bumper 10 has a maximum height represented by D7. As illustrated, the maximum height D8 of the rear surface 110 of the replacement bumper 20 is greater than the maximum height D7 of the rear surface 110' of the OEM bumper 10.

Further, the rear surface 110 has an angle α3 relative to bottom surface 102 that is greater than angle α4 defined by the rear surface 110' relative to bottom surface 102'.

As will be understood, the rear surface 110 of the replacement bumper 20 has a greater maximum height D8 than the maximum height D7 of the rear surface 110' of the OEM bumper 10 because the rear surface 110 of the replacement bumper 20 is the portion of the replacement bumper 20 that prevents the over rotation of the spindle 13 in the first direction 30 about the axis of rotation 29 of the spindle bolt 19 (see FIGS. 2A-2B).

As previously discussed, this prevents too much of the front portion 24 of the ski 14 from contacting the ground 23 while also causing more of the rear portion 25 of the ski 14 to contact the ground 23 during use, which is the ideal situation for a ski 14 if you want to prevent the ski 14 from darting during use with a snowmobile.

As is also illustrated, the OEM bumper 10 and the replacement bumper 20 have corresponding notches 111', 111 along their respective bottom surfaces 102', 102.

As will be understood, these notches 111', 111 fit with corresponding projections in the bumper pocket 11 along the top surface 15 of the ski 14. The corresponding projections along the top surface 15 of the ski 14 help to align and/or secure the OEM bumper 10 and/or replacement bumper 20 along the top surface 15 of the ski 14 during the installation of the OEM bumper 10 and/or replacement bumper 20 in the ski assembly 12 (see FIGS. 1A-1B and 2A-2B).

Figure 4:
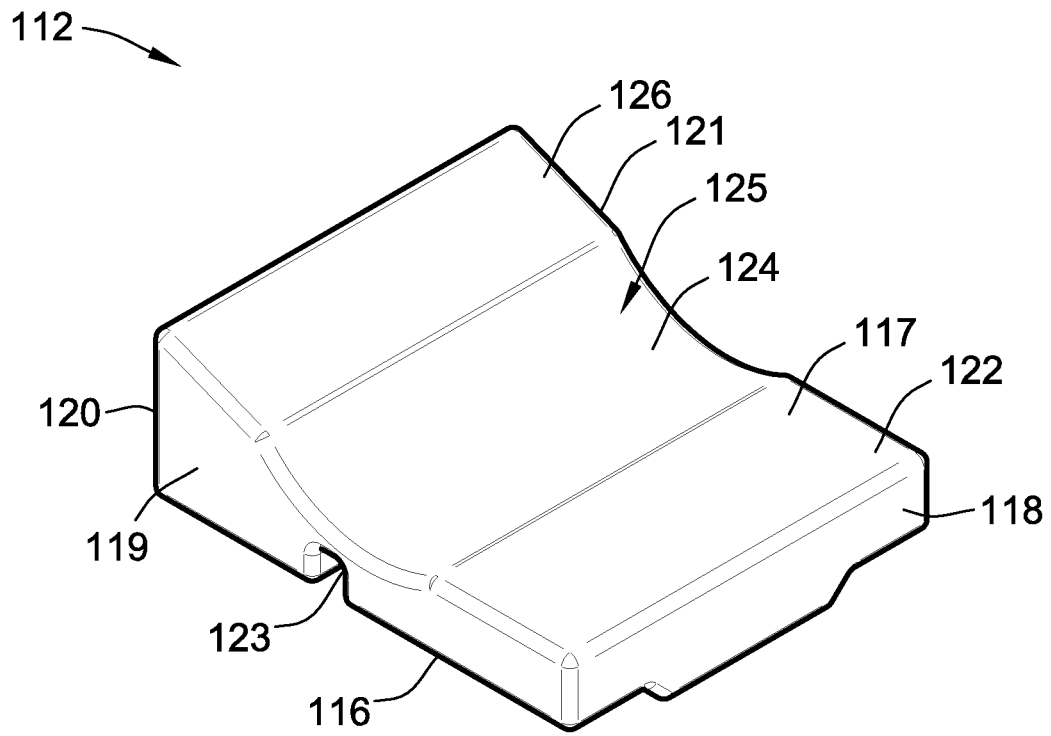
FIG. 4 is a perspective view of an embodiment of a replacement snowmobile ski bumper according to one embodiment of the present application.
Figure 5:
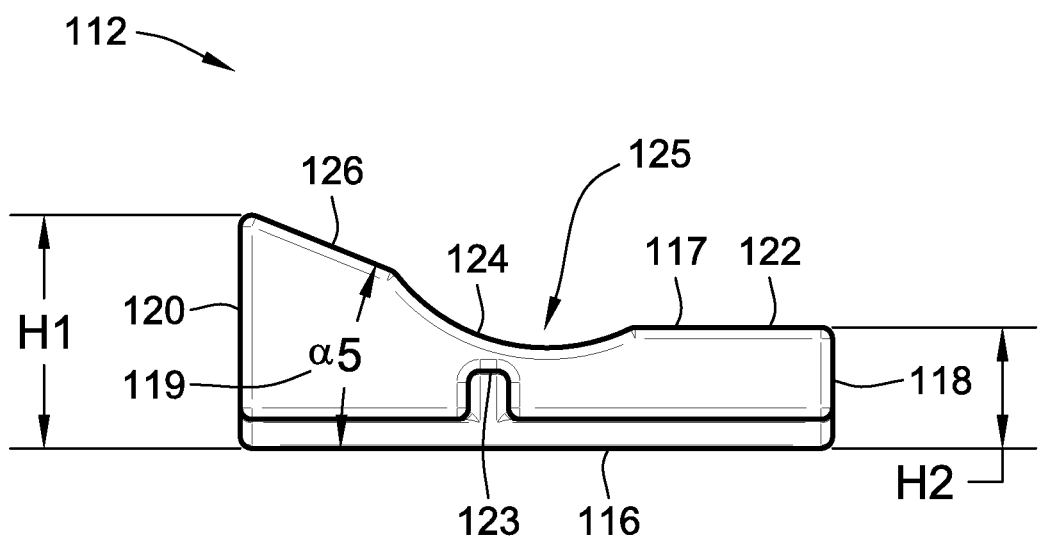
FIG. 5 is a side view of the replacement snowmobile ski bumper of FIG. 4.

Turning to FIGS. 4 and 5 illustrating another embodiment of a replacement bumper 112 according to one aspect of the present application. The replacement bumper 112 can be used to replace, but is not limited to replacing, an OEM bumper designed to be used with Ski-Doo snowmobiles.

As illustrated, the replacement bumper 112 has a top surface 117 and a bottom surface 116, a front end wall 118, a rear end wall 120, a first sidewall 119 and a second sidewall 121.

The top surface 117 has a front surface 122, a spindle pocket surface 124, and an abutment surface 126. The front surface 122 is generally parallel to bottom surface 116 and located adjacent the front end wall 118 of the replacement bumper 112.

The spindle pocket surface 124 is concave like in the other embodiments and defines a spindle receptacle 125. When the replacement bumper 112 is being used in a ski assembly 12 the coupling member 26 of the spindle 13 will abut against the spindle pocket surface 124 that defines the spindle receptacle 125.

The top surface 117 also has an abutment surface 126 that increases in height between the spindle pocket surface 124 and the rear end wall 120.

After installing the replacement bumper 112 in a snowmobile ski assembly 12 the abutment surface 126 of the replacement bumper 112 will abut against the neck portion 28 of the spindle 13. The contact made between the abutment surface 126 and the neck portion 28 will force rotation of the ski 14 in the second direction 31 compared to an OEM bumper 10 and result in a decrease in the contact surface area between the front portion 24 of the ski 14 and the ground 23 relative to the OEM bumper being replaced while also increasing and the contact surface area between the rear portion 25 of the ski 14 and the ground 23 relative to the OEM bumper being replaced.

Also illustrated in FIGS. 4 and 5 is the tiered/stepped bottom surface 116 of the replacement bumper 112 that also includes notches 123. As will be understood, the notches 123 fit with corresponding projections and the tiered bottom surface fit with corresponding depressions or projections in the bumper pocket 11 along the top surface 15 of the corresponding ski 14 that the replacement bumper 112 is designed to be used with.

As discussed above, the corresponding projections and/or depressions along the top surface 15 of the ski 14 help to align and/or secure the replacement bumper 112 along the top surface 15 of the ski 14 that the replacement bumper 112 is designed to be used with during the instillation of the replacement bumper 112 within the its corresponding ski assembly 12.

Figure 6:
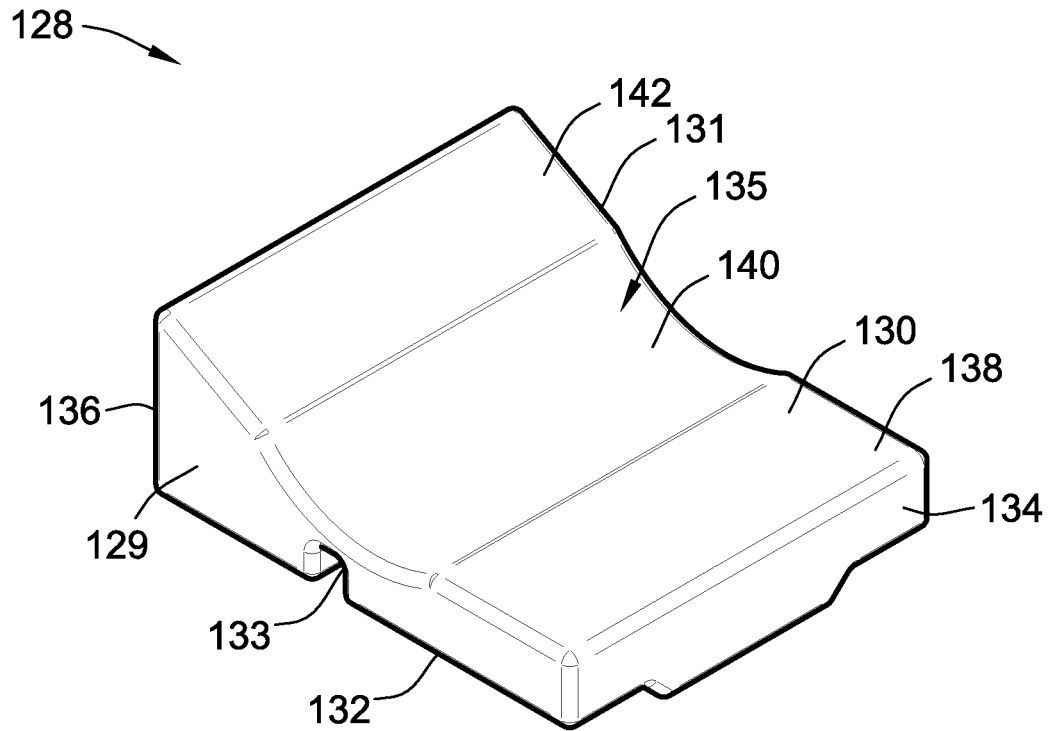
FIG. 6 is a perspective view of an embodiment of a replacement snowmobile ski bumper according to one embodiment of the present application.
Figure 7:
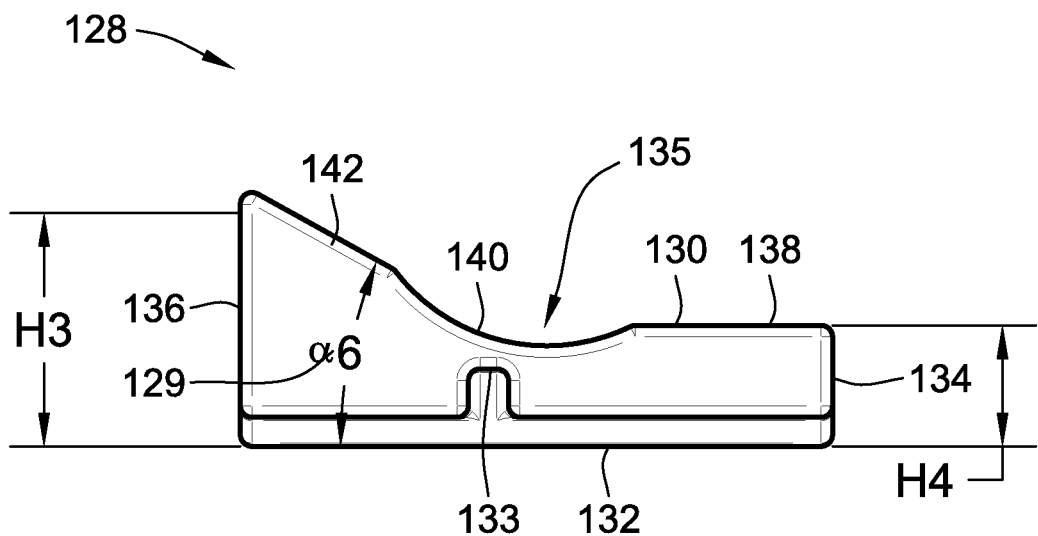
FIG. 7 is a side view of the replacement snowmobile ski bumper of FIG. 6.

Turning to FIGS. 6 and 7 illustrating another embodiment of a replacement bumper 128 according to one aspect of the present application. The replacement bumper 128 can be used to replace, but is not limited to replacing, an OEM bumper designed for use with Ski-Doo snowmobiles.

As illustrated, the replacement bumper 128 has a top surface 130 and a bottom surface 132. The top surface 130 and the bottom surface 132 are defined in a first direction by a front end wall 134 and a rear end wall 136 and in a second direction by a first side wall 129 and a second side wall 131.

The top surface 130 has a front surface 138, a spindle pocket surface 140, and an abutment surface 142. The front surface 138 being flat and located adjacent the front end wall 134 of the replacement bumper 128. The spindle pocket surface 140 being concave and defining a spindle receptacle 135. The abutment surface 142 increasing in height as it tapers away from the spindle pocket surface 140 to create and angled surface that terminates at the rear end wall 136 of the replacement bumper 128.

The bottom surface 132 being tiered and having notches 133. As discussed above relative to FIGS. 5 and 6, the bottom surface being tiered and having notches 133 fit with corresponding projections and the tiered bottom surface fit with corresponding depressions or projections in the bumper pocket 11 along the top surface 15 of the corresponding ski 14 that the replacement bumper 128 is designed to be used with.

Figure 8:
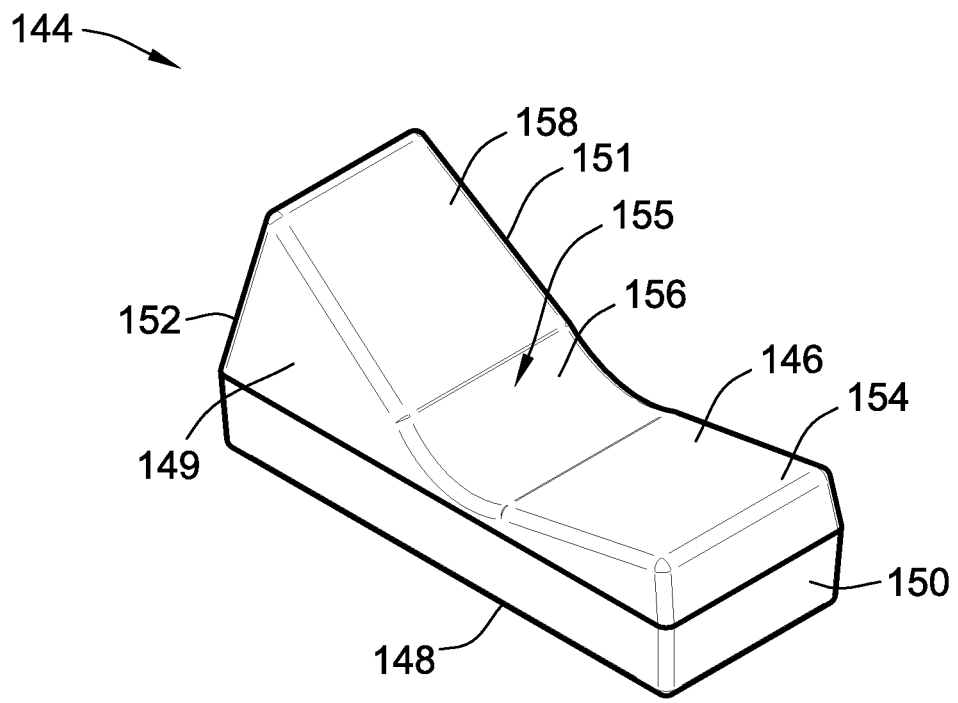
FIG. 8 is a perspective view of an embodiment of a replacement snowmobile ski bumper according to one embodiment of the present application.
Figure 9:
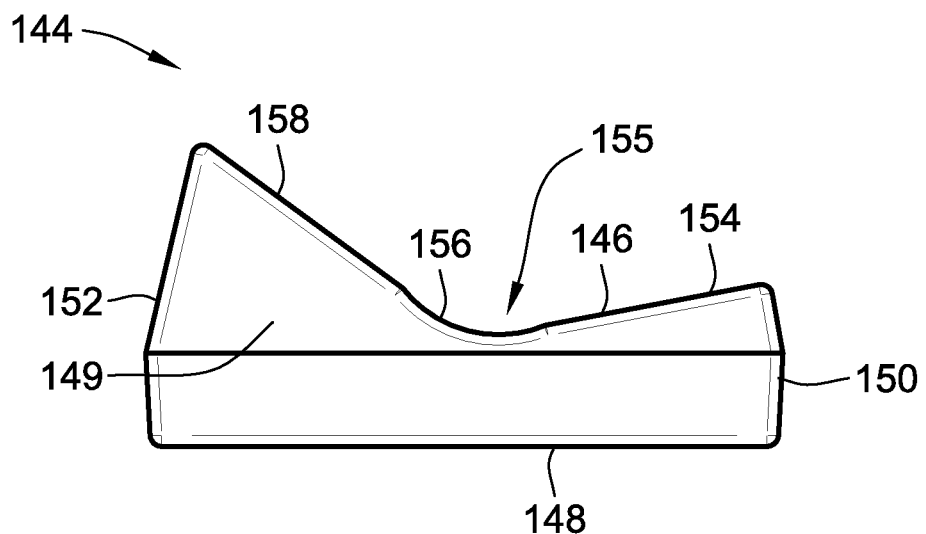
FIG. 9 is a side view of the replacement snowmobile ski bumper of FIG. 8.

Turning to FIGS. 8 and 9 illustrating another embodiment of a replacement bumper 144 according to one aspect of the present application. The replacement bumper 144 can be used to replace, but is not limited to replacing, an OEM bumper designed for use with Polaris snowmobiles.

As illustrated, the replacement bumper 144 has a top surface 146 and a bottom surface 148. The top surface 146 and the bottom surface 148 are defined in a first direction by a front end wall 150 and a rear end wall 152 and in a second direction by a first side wall 149 and a second side wall 151.

The top surface 146 having a front surface 154, a spindle pocket surface 156, and an abutment surface 158. The front surface 154 having a greater height closer to the front end wall 150 than adjacent the spindle pocket surface 156 to create a surface that is angled in a downward direction from the front end wall 150 to the spindle pocket surface 156. The spindle pocket surface 156 being concave and defining a spindle receptacle 155. The abutment surface 158 increasing in height between the spindle pocket surface 156 and the rear end wall 152 that creates a surface that is angled and has a maximum height as it terminates adjacent the rear end wall 152.

As illustrated, the replacement bumper 144 has a bottom surface 148 that is flat or does not include tiers or notches, such as the replacement bumpers 112, 128 that are illustrated in FIGS. 4-7.

As will be understood, replacement bumpers having a flat bottom surface may be notched or tiered and replacement bumpers having a notched or tiered bottom surface may be flat in order to adjust for the variety of snowmobile ski assemblies 12 that the replacement bumpers designed according to the principles of this application may be designed to be used with.

OEM bumpers 10 are typically made from a soft rubber material, which causes the OEM bumpers 10 to wear over time due to the constant pressure and contact between the OEM bumper 10 and the ski 14 and the OEM bumper 10 and the spindle 13. Therefore, OEM bumpers 10 made of soft rubber material will typically deform relatively quickly, which requires the user to continuously replace the OEM bumpers 10 on their snowmobile.

The replacement bumpers 20, 112, 128, and 144 described herein can be made from any suitable material that is strong and resilient, such as, but not limited to, any type of elastomeric material, elastomer, polymer, or rubber.

In a preferred embodiment, the replacement bumpers 20, 112, 128, and 144 are made of polyurethane, which is a strong and resilient material, that is well designed to handle the pressure and contact between the replacement bumpers 20, 112, 128, and 144 and the ski 14 and the replacement bumpers 20, 112, 128, and 144 and the spindle 13 during use, which typically will mean a user will not need to replace the replacement bumpers 20, 112, 128, and 144 as OEM bumpers 10 made from a soft rubber material.

Turning back to FIGS. 1A-1B and 2A-2B a method of replacing an OEM bumper 10 with a replacement bumper 20 in a ski assembly will be described. In a ski assembly 12 using an OEM bumper 10, the OEM bumper 10 will be between the top surface 15 of the ski 14 and the coupling portion 26 of the spindle 13. The spindle bolt 19 will be inserted through the first opening 18 in the first sidewall 16 of the ski 14, through the opening 27 of the coupling portion 26 of the spindle 13, and then through the second opening 18 in the second sidewall 16 of the ski 14.

Typically, the spindle bolt 19 will be locked in place to prevent the spindle bolt 19 from dislodging from the first or second opening 18 of the ski 14 or the opening 27 of the coupling portion 26 of the spindle 13.

Therefore, to remove the OEM bumper 10 from the ski assembly 12, the user must first unlock the spindle bolt 19 and then slide the spindle bolt 19 so that it is no longer inserted into the first or second opening 18 of the sidewalls 16 of the ski 14 or the opening 27 of the coupling portion 26 of the spindle 13. This will release the mechanical coupling between the spindle 13 and the ski 14 and will allow for the removal of the ski 14 from the spindle 13.

After removing the ski 14 from the spindle 13, the OEM bumper 10 can be removed from the bumper pocket 11 of the ski 14 and replaced with a corresponding replacement bumper 20.

Once the replacement bumper 20 is in place in the bumper pocket 11 of the ski 14, then the spindle 13 is placed against the replacement bumper 20, such that the coupling portion 26 of the spindle 13 rests against the replacement bumper 20 and the opening 27 of the coupling portion 26 of the spindle 13 is aligned with the openings 18 in the first and second sidewalls 16 of the ski 14.

After aligning the opening 27 of the coupling portion 26 of the spindle 13 with the openings 18 formed in the sidewalls 16 of the ski 14, the spindle bolt 19 is inserted through the opening 18 of the first sidewall 16 of the ski 14. Then the spindle bolt 19 is inserted through the opening 27 formed in the coupling portion 26 of the spindle 13. Then the spindle bolt 19 is inserted through the opening 18 in the second sidewall 16 of the ski 14.

Finally, the spindle bolt 19 is locked to prevent the spindle bolt 19 from dislodging from the opening 18 of the first or second sidewall 16 of the ski 14 and/or the opening 27 of the coupling portion 26 of the spindle 13. Attaching the replacement bumper 20 to the ski 14 will change the orientation of the ski 14 relative to the spindle 13 and the ground 23.

As will be understood, different snowmobiles have different skis, spindles, and spindle bolts. Therefore, the embodiment of the method for removing an OEM bumper 10 and installing a replacement bumper 20 is not meant to be limited to a ski assembly 12 as illustrated in FIGS. 1A-1B and 2A-2B.

Indeed, it is envisioned that the principles of the replacement bumpers disclosed herein and the method for removing OEM bumpers and installing such a replacement bumper can be used to replace any OEM bumper design used with any type of ski assembly design.

While described above as causing the ski 14 to rotate relative to axis 29, in some embodiments the ski 14 may have the same orientation relative to the ground 23, when resting on the ground 23, after the replacement bumper 20 has been installed. However, a portion of the replacement bumper 20, such as the rear surface 110 will be compressed to a greater extent creating increased force between the spindle 13 and the rear portion 25 of the ski 14, which will cause an increased down pressure at the rear portion 25 of the ski 14.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of adjusting the orientation of a snowmobile ski, the snowmobile ski having a front end and a rear end, the snowmobile ski being mounted to a spindle at a pivot axis between the rear end and front end of the ski, the method comprising:
   removing a OEM bumper positioned between a free end of the spindle and a ski body of the snowmobile ski, the OEM bumper having a first abutment portion positioned between the rear end of the ski and the pivot axis prior to removing the OEM bumper that contacts the spindle, the front end and rear end of the ski having a first orientation when the first abutment portion contacts the spindle;
   installing a replacement bumper positioned between the free end of the spindle and the ski body of the ski, the replacement bumper having a second abutment portion positioned between the rear end of the ski and the pivot axis when installed that contacts the spindle, the front end and rear end of the ski having a second orientation when the second abutment portion contacts the spindle; and
   wherein the ski having less weight distributed on the front end of the ski in the second orientation than the first orientation and the ski having more weight distributed on the rear end of the ski in the second orientation than the first orientation.

2. The method of claim 1, wherein:
   the ski body has a bumper mounting surface on which a first mounting surface of the OEM bumper rests when installed, the first abutment portion defining a first contact surface that contacts the spindle at a location between the rear end of the ski and the pivot axis, the first contact surface being spaced a first distance from the first mounting surface;
   the replacement bumper having a second mounting surface which rests on the bumper mounting surface when installed, the second abutment portion defining a second contact surface that contacts the spindle at a location between the rear end of the ski and the pivot axis when installed, the second contact surface being spaced a second distance from the second mounting surface, the second distance being greater than the first distance.

3. The method of claim 1, wherein the replacement bumper is made from polyurethane.

4. The method of claim 1, wherein the installation of the replacement bumper changes the weight distribution from the front end of the ski to the rear end of the ski by 1 to 100%.

5. The method of claim 1, wherein the replacement bumper has a maximum height relative to a top of the ski when the replacement bumper is installed in the ski that is greater than a maximum height of the OEM bumper relative to the top of the ski the OEM bumper is installed in the ski.

6. The method of claim 5, wherein the maximum height of the replacement bumper is between 0.1 inches and 0.5 inches greater than the maximum height of the OEM bumper.

7. The method of claim 1, wherein the pivot axis is provided by a spindle bolt passing through an opening in the spindle and a first and second opening in the ski.

8. The method of claim 7, wherein the spindle bolt has a lock that mechanically couples the spindle and the ski.

9. The method of claim 8, wherein the ski can still rotate about the pivot axis after being mechanically coupled to the spindle.

10. A method of adjusting the orientation of a snowmobile ski, the snowmobile ski having a front end and a rear end, the snowmobile ski being mounted to a spindle at a pivot axis between the rear end and front end of the ski, the method comprising;
removing a first bumper positioned between the spindle and a top surface of the ski, the first bumper having a first abutment surface that prior to removing the first bumper contacts the spindle, the ski having a first orientation relative to a planar ground surface when the first abutment surface contacts the spindle;
installing a second bumper positioned between the spindle and a top surface of the ski, the second bumper having a second abutment surface that when installed contacts the spindle, the ski having a second orientation relative the ground surface when the second abutment surface contacts the spindle; and
wherein, in the second orientation a front end of the ski is further from the ground than in the first orientation.

11. The method of claim 10, wherein in the second orientation a rear end of the ski is closer to the ground than in the first orientation.

12. The method of claim 10, wherein the pivot axis is provided by an axis of rotation of a spindle bolt.

13. The method of claim 10, further comprising the step of:
inserting a spindle bolt into an opening of the ski and an opening of the spindle after the installation of the second bumper to mechanically couple the ski to the spindle.

14. A method of adjusting the orientation of a snowmobile ski, the snowmobile ski having a front end and a rear end, the snowmobile ski being mounted to a spindle at a pivot axis between the rear end and front end of the ski, the method comprising:
removing a OEM bumper positioned between a free end of the spindle and a ski body of the snowmobile ski, the OEM bumper having a first abutment portion positioned between the rear end of the ski and the pivot axis prior to removing the OEM bumper that contacts the spindle, the ski having a first orientation wherein the front end of the ski has a first angle relative to the planar ground and the rear end of the ski has a first angle relative to the planar ground;
installing a replacement bumper positioned between the free end of the spindle and the ski body of the ski, the replacement bumper having a second abutment portion positioned between the rear end of the ski and the pivot axis when installed that contacts the spindle, the ski having a second orientation wherein the front end of the ski has a second angle relative to the planar ground and the rear end of the ski has a second angle relative to the planar ground,
wherein in the second orientation the angle between the front end of the ski and the planar ground is greater than in the first orientation; and
wherein in the first orientation the angle between the rear end of the ski and the planar ground is greater than in the second orientation.

15. The method of claim 14, wherein:
the ski body has a bumper mounting surface on which a first mounting surface of the OEM bumper rests when installed, the first abutment portion defining a first contact surface that contacts the spindle at a location between the rear end of the ski and the pivot axis, the first contact surface being oriented at a first angle relative to the mounting surface;
the replacement bumper having a second mounting surface which rests on the bumper mounting surface when installed, the second abutment portion defining a second contact surface that contacts the spindle at a location between the rear end of the ski and the pivot axis when installed, the second contact surface being oriented at a second angle relative to the mounting surface; and
wherein the second angle is less than the first angle.

16. The method of claim 14, wherein the installation of the replacement bumper changes an orientation between the front end of the ski and the rear end of the ski by between 1 and 45 degrees.

* * * * *